United States Patent
Doken

(10) Patent No.: US 12,133,023 B2
(45) Date of Patent: *Oct. 29, 2024

(54) SYSTEMS AND METHODS FOR OFFLOADING PROCESSING-INTENSIVE VIDEO CONFERENCING TASK TO EDGE COMPUTING DEVICE

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,310

(22) Filed: Nov. 7, 2023

(65) Prior Publication Data

US 2024/0155075 A1 May 9, 2024

Related U.S. Application Data

(63) Continuation of application No. 17/545,318, filed on Dec. 8, 2021, now Pat. No. 11,849,258.

(51) Int. Cl.
 *H04N 7/15* (2006.01)
 *G06F 11/30* (2006.01)
 *H04N 7/14* (2006.01)

(52) U.S. Cl.
 CPC ......... *H04N 7/157* (2013.01); *G06F 11/3013* (2013.01); *G06F 11/3041* (2013.01); *H04N 7/142* (2013.01)

(58) Field of Classification Search
 CPC .... H04N 7/157; H04N 7/142; G06F 11/3013; G06F 11/3041
 See application file for complete search history.

(56) References Cited

U.S. PATENT DOCUMENTS

| | | | |
|---|---|---|---|
| 5,915,972 A | 6/1999 | Tada | |
| 11,601,848 B2* | 3/2023 | Jung | ................. H04W 28/0967 |
| 2020/0077050 A1 | 3/2020 | Sato et al. | |
| 2021/0248047 A1* | 8/2021 | Jayaram | .............. G06F 9/45558 |
| 2022/0058880 A1* | 2/2022 | Bondich | ................. G06T 17/00 |
| 2022/0236782 A1 | 7/2022 | Viswanathan Iyer et al. | |
| 2022/0245904 A1* | 8/2022 | Saxena | ............... G06F 11/3419 |
| 2022/0295012 A1 | 9/2022 | Swierk et al. | |
| 2022/0408016 A1 | 12/2022 | Krishnakumar et al. | |
| 2023/0179742 A1 | 6/2023 | Doken | |

* cited by examiner

*Primary Examiner* — Phung-Hoang J Nguyen
(74) *Attorney, Agent, or Firm* — Haley Guiliano LLP

(57) ABSTRACT

Systems and methods are described for determining that a conferencing device participating in a video conference via a conferencing server is a mobile device. The mobile device may be performing virtual background processing to generate for display a virtual background during the video conference. Based on a monitored parameter of the mobile device, a determination may be made whether the virtual background processing being performed by the mobile device should be offloaded to an edge computing device. In response to determining the virtual background processing should be offloaded, at least a portion of the virtual background processing being performed by the mobile device may be offloaded to the edge computing device, and the edge computing device may be configured to receive a video feed from the conferencing device, modify the video feed by performing the virtual background processing, and transmit the modified video feed to the conferencing server.

20 Claims, 9 Drawing Sheets

| 302 | 304 | 306 | 308 | 310 | 312 | 314 | 316 | 318 | 320 | 322 | 324 | 326 |
|---|---|---|---|---|---|---|---|---|---|---|---|---|
| Users in Video Conference | Type of Conferencing Device of User | Time Remaining in Conference | Current Battery Level | Virtual Background Processing Rate of Battery Consumption | Receive/Transmit Power Rate of Battery Consumption | Encoding Rate of Battery Consumption | Decoding Rate of Battery Consumption | Graphics Display Rate of Battery Consumption | Other Processes Rate of Battery Consumption | Connection | Current Rate of Battery Consumption | Movement Sensor Data |
| User A User B | Mobile Device (Google Pixel 5) | 50 Minutes | 38% | 0.4%/Minute | 0.1%/Minute | 0.1%/Minute | 0.1%/Minute | 0.2%/Minute | 0.2%/Minute | Cellular Data | 1.1%/Minute | 3 mph |

SYSTEMS AND METHODS FOR OFFLOADING PROCESSING-INTENSIVE VIDEO CONFERENCING TASK TO EDGE COMPUTING DEVICE

CROSS-REFERENCE TO RELATED APPLICATIONS

This application is a continuation of U.S. patent application Ser. No. 17/545,318, filed Dec. 8, 2021, the disclosure of which is hereby incorporated by reference herein in its entirety.

BACKGROUND

This disclosure is directed to systems and methods for offloading one or more processing-intensive video conferencing tasks to one or more edge computing devices. In particular, techniques are disclosed for determining, based on a parameter of a mobile device participating in a video conference, whether virtual background processing being performed by the mobile device should be offloaded to an edge computing device.

SUMMARY

Advancements in communication technology have improved the ability of users to communicate (e.g., such as via video conferencing) with colleagues, family and friends located in different physical locations than the user. For example, conferencing systems (e.g., Microsoft® Teams, Skype®, Google Hangouts®, Zoom™, etc.) may be used to host online video meetings, with parties joining virtually from around the world, to enable colleagues in separate, geographically distributed physical locations to have a collaborative face-to-face conversation via a video conference, even if one or more of such users are on the go (e.g., utilizing a smartphone or a tablet). Many users have been accustomed to using virtual backgrounds during a video conferencing session, such as to display their favorite place or object, add a personal touch, or simply hide their physical background, which they may not wish to share with the other conference participants. Processing to provide the virtual background includes detecting the exact shape of a human figure being captured by a camera, and replacing the remainder of the frame with the selected virtual background. Virtual backgrounds may be particularly useful for a mobile video conference session participant because he or she may prefer other conference participants not to see where he or she is (e.g., a crowded public place, walking outdoors, riding on a vehicle, at the airport, at the grocery, at a restaurant, etc.), and he or she may prefer to avoid other conference participants being distracted by background objects or persons in the physical surroundings of the user.

However, enabling mobile devices to efficiently participate in a video conferencing session presents certain challenges. For example, certain processing tasks (e.g., virtual background processing) performed at the mobile device to facilitate video conferencing sessions are particularly CPU-intensive and consume a significant amount of power, which may be problematic for mobile devices operating on battery power that is inherently limited and participating in the conference via a cellular network, such as while the user is on the move (e.g., at a high speed in a vehicle). Moreover, mobile devices performing such computationally intensive tasks may become particularly hot, which may be uncomfortable for the user holding the mobile device during the video conference session. In one approach, during the video conference, the mobile device may decline to perform, or stop performing, certain processes, such as virtual background processing; or lower an image resolution of a transmitted image of the user; or turn off its camera such that the user can only participate in the conference via audio. However, such approach negatively impacts the video conferencing experience of the user and the other conference participants, who are provided with a lower-quality image of the user without the virtual background or without any visual representation of the user at all. In another approach, the video conferencing experience of the user may be maintained at the expense of battery of the mobile device, which may lead to the mobile device running out of battery life before the end of the conference, or the mobile device being left with a very low battery level at the conclusion of the conference.

To overcome these problems, systems and methods are provided herein form determining that a conferencing device, participating in a video conference via a conferencing server, is a mobile device, wherein the mobile device is performing virtual background processing to generate for display a virtual background during the video conference, and monitoring a parameter of the mobile device during the video conference. Based on the monitored parameter, a determination may be made whether the virtual background processing being performed by the mobile device should be offloaded to an edge computing device (e.g., proximate to the mobile device or locally available), and configured to receive one or more offloaded processing tasks otherwise performed at the mobile device. In response to determining the virtual background processing should be offloaded, at least a portion of the virtual background processing being performed by the mobile device may be offloaded to the edge computing device, wherein the edge computing device may be configured to receive a video feed from the conferencing device, modify the video feed by performing the virtual background processing, and transmit the modified video feed to the conferencing server.

Such aspects enable intelligently offloading processing-intensive video conferencing tasks to an edge computing device (e.g., a mobile edge computing device) based on monitored parameters (e.g., current power consumption) of a mobile device participating in a video conference. Such features enable the mobile device participating in the video conference to conserve battery life and remain joined to the video conference for a longer period of time, while maintaining desired characteristics for the video conference (e.g., a particular virtual background). Selectively utilizing the processing capabilities of the mobile edge computing devices (e.g., such as, for example, only if mobile device is likely to run out of power) may be desirable, since in certain locations, coverage may be sparse and thus the resources of the mobile edge computing devices may be at a premium. For example, it may be desirable that processing should generally be performed locally, unless it is determined that processing should be offloaded to the mobile edge computing devices based on the techniques described herein. In some embodiments, any suitable processing task may be offloaded to the edge computing device, in addition or as an alternative to virtual background processing. For example, encoding of a video feed may be offloaded from a conferencing device to the edge computing device, e.g., by transmitting raw video data to the edge computing device and performing encoding of such video data at the edge computing device.

In some aspects of this disclosure, in response to determining the virtual background processing should be offloaded, the provided systems and methods further cause the conferencing device to transmit a partial video feed, instead of transmitting a full video feed, wherein the partial video feed comprises a depiction of a human figure. Such partial video feed may be a polygonal portion of the video feed defined by identifying a polygon that comprises the depiction of the human figure. Such transmission of the partial video feed may be less computationally intensive and consume fewer computing resources than if a full video feed (e.g., detecting the exact boundaries of the human figure and/or comprising an inserted virtual background) were to be transmitted to the edge computing device. In some embodiments, the video feed, e.g., the polygonal portion of the video feed, may be transmitted as a raw video feed to the edge computing device, and any suitable processing (e.g., encoding of the video feed) may be performed at the edge computing device.

In some embodiments, monitoring the parameter of the mobile device during the video conference comprises determining a current battery level of the mobile device, and determining whether the current battery level exceeds a threshold battery level; and the determining, based on the monitored parameter, of whether the virtual background processing being performed by the mobile device should be offloaded to an edge computing device is performed based on whether the current battery level exceeds the threshold battery level.

In some aspects of this disclosure, monitoring the parameter of the mobile device during the video conference comprises determining a current battery level of the mobile device, determining an amount of time remaining in the video conference, and determining a rate of battery consumption based on video conferencing processing tasks being performing by the mobile device. The provided systems and methods may determine, based on the monitored parameter, whether the virtual background processing being performed by the mobile device should be offloaded to an edge computing device by determining whether the battery of the mobile device will fall below a threshold level of charge before the conclusion of the video conference if virtual background processing continues to be performed by the mobile device.

In some embodiments, determining whether the virtual background processing should be offloaded further comprises transmitting an indication, to an edge computing service associated with a plurality of edge computing devices, that the battery of the mobile device will fall below a threshold of charge before the conclusion of the video conference if virtual background processing continues to be performed by the mobile device. The edge computing service may be configured to identify, as the edge computing device, an edge computing device of the plurality of edge computing devices determined to be located at a closest location to the mobile device of the plurality of edge computing devices, and transmit an indication to the mobile device to cease performing the virtual background processing and to transmit the video feed to the edge computing device.

In some aspects of this disclosure, the provided systems and methods are further configured to determine, subsequent to offloading at least a portion of the virtual background processing being performed by the mobile device to the edge computing device, and based on the monitored parameter, that the mobile device should resume performance of the virtual background processing; transmit an indication to the edge computing device to cease performing the virtual background processing; and transmit an indication to the mobile device to resume performing the virtual background processing.

In some embodiments, determining that the mobile device should resume performance of the virtual background processing is performed based on the current battery level of the mobile device, the amount of time remaining in the video conference, and the rate of battery consumption. In some embodiments, an additional conferencing device is participating in the video conference, and the edge computing device is configured to: receive, from the additional conferencing device, a video feed intended for the mobile device; process the video feed intended for the mobile device; and transmit the processed video feed to the mobile device.

In some aspects of this disclosure, monitoring a parameter of the mobile device during the video conference comprises determining, based on sensor data received from the mobile device, that a video frame captured by the mobile device during the video conference is unstable, wherein the sensor data is indicative of movement of the mobile device. In some embodiments, offloading at least a portion of the virtual background processing being performed by the mobile device to the edge computing device comprises causing the unstable video frame to be transmitted to the edge computing device, wherein the edge computing device stabilizes the video frame based at least in part on the sensor data. In some embodiments, the mobile device is a smartphone, and the edge computing device is a mobile edge computing device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 shows an illustrative data structure for use in determining whether a video conference processing task being performed by a mobile device during a video conference should be offloaded to an edge computing device, in accordance with some embodiments of this disclosure.

DETAILED DESCRIPTION

Figure 1:
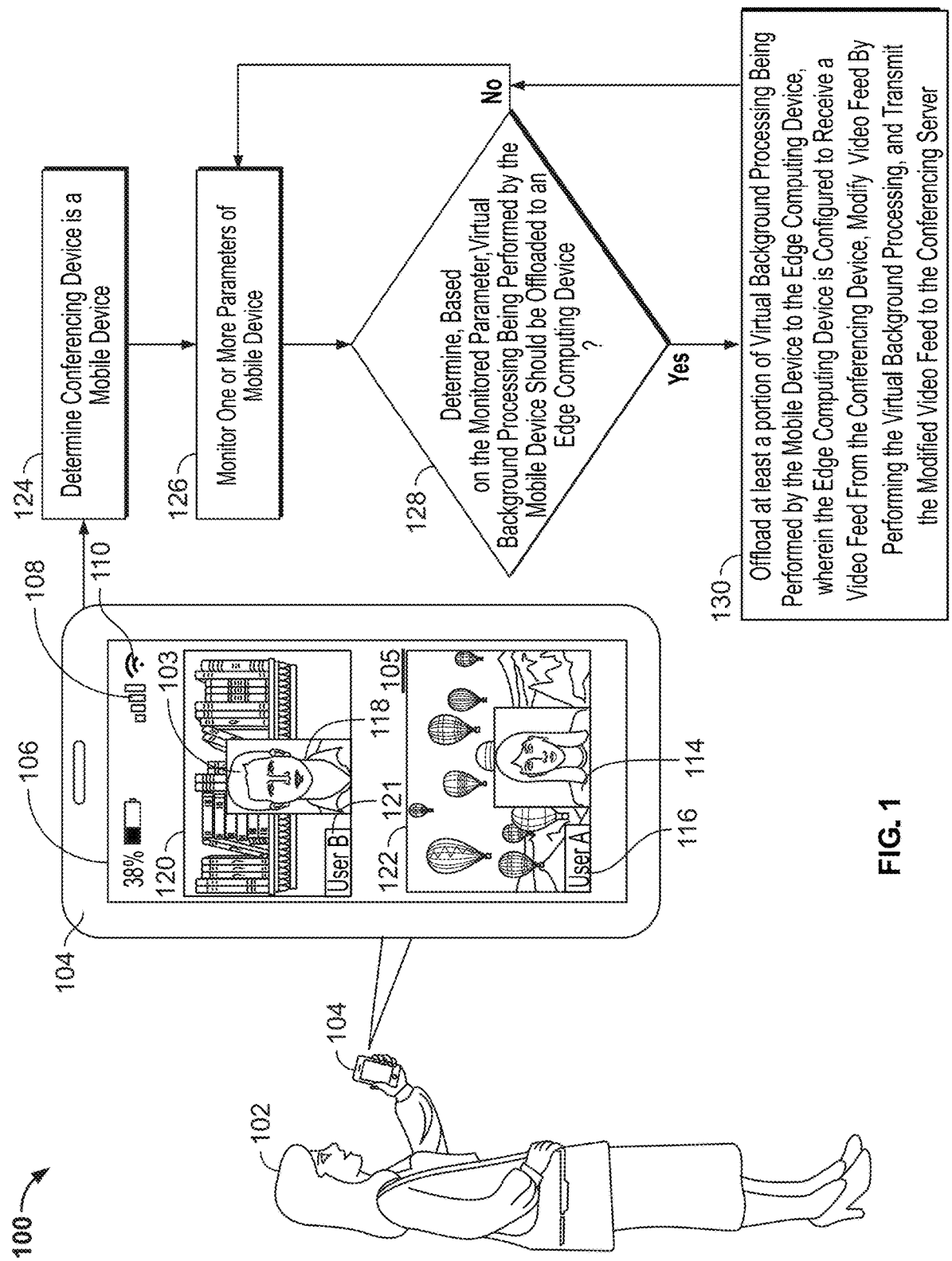
FIG. 1 shows a block diagram of an illustrative system for determining whether a video conference processing task being performed by a mobile device during a video conference should be offloaded to an edge computing device, in accordance with some embodiments of this disclosure.

FIG. 1 shows a block diagram of an illustrative system 100 for determining whether a video conference processing task being performed by a mobile device during a video conference should be offloaded to an edge computing device, in accordance with some embodiments of this disclosure. A conferencing application (e.g., executed at least in part on user equipment device 104 and/or a remote server, such as, for example, a conferencing server 210 located at cloud data center 204 of FIG. 2 and/or a mobile edge computing device 212 located at mobile operator or cable head end 206 of FIG. 2) may enable users to join a video and/or audio conference to enable communication with other users over a network (e.g., communication network 606 of FIG. 6). For example, the conferencing application may enable user equipment device 104 associated with user 102 to receive over the network audio signals (e.g., spoken by user 103 and/or other audio present in the environment surrounding user 103, and detected by a microphone of a user equipment device of user 103) and images (e.g., still images and/or video, and detected by a camera of a user equipment device of user 103) depicting the environment surrounding user 103 and/or text messages and/or a shared screen. The conferencing application may further enable a user equipment device associated with user 103 to receive over the network audio signals (e.g., spoken by user 102 and/or other audio present in the environment surrounding user 102, and detected by a microphone of user equipment device 104) and images (e.g., still images and/or video, and detected by a camera of user equipment device 104) depicting the environment surrounding user 102 and/or text messages and/or a shared screen. Conferencing server 210 may host the video conference, and each attendee may access the video conference via a connected device accessing one or more of a web address or virtual room number, e.g., by entering his or her username and password. In some embodiments, one or more virtual meeting attendees may be a moderator or host, where a designated moderator may have the task of organizing the meeting and/or selecting the next participant member to speak or present.

In some embodiments, video and audio feeds associated with the respective conference participants may be transmitted separately during the video conference, along with a header or metadata (e.g., time stamps) to enable synchronization of the audio and video feed at the destination device, or audio and video data may be combined as a multimedia data stream. In some embodiments, any suitable audio or video compression techniques may be utilized during transmission of the audio and video components of the video conference. In some embodiments, user 102 and user 103 may be located in different geographical locations, and the video conferencing session may be assigned, e.g., by conferencing server 604, a unique conference identifier. While two users are shown participating in the video conferencing session in the example of FIG. 1, any suitable number of users may participate in the video conferencing session, and depictions of the users participating in the video conferencing session may be arranged in any suitable format (e.g., to depict a current speaker only, a depiction of each conference participant including the user himself or herself, a subset of the conference participants, etc.).

The conferencing application may generate for display user interface 105 at user equipment device 104 (e.g., a smartphone or tablet). User interface 105 may comprise a video depiction 114 of user 102 participating in a video conference session, and an indication 116 of a user name ("User A") associated with a user profile or user account of user 102 associated with the conferencing application. User interface 105 may further comprise a video depiction 118 of user 103 participating in the video conference session, and an indication 121 of a user name ("User B") associated with a user profile or user account of user 103 associated with the conferencing application. In some embodiments, user interface 105 may comprise an indication of a total duration of the video conference session and/or an elapsed time of the video conference session, a selectable option to mute the user's own microphone and/or a selectable option turn off the user's own camera, a chat function, and any other suitable number of selectable options.

Background 120 depicted behind user 103 in the video feed of the conference session may correspond to the physical environment of user 103 (e.g., a bookshelf located in the room that user 103 is present in). On the other hand, background 122 depicted behind user 102 may correspond to a virtual background, which may depict any suitable image or video or animation (e.g., balloons, a beach, a mountain range, etc.) simulating an environment desired by user 102. In some embodiments, virtual background 122 may comprise augmented reality elements to alter the appearance of user 102 to other conference participants, blurring of the physical environment, or blacking out of the physical environment. In some embodiments, virtual background 122 may be selected by user 102 from among a plurality of virtual backgrounds provided by the conferencing application, or the conferencing application may permit user 102 to upload an image for use as a virtual background, or import virtual backgrounds from any suitable source.

In some embodiments, the conferencing application may be configured to generally perform virtual background processing locally at mobile device 104, to insert virtual background 122 into the video feed depicting user 102 at 114 during the video conferencing session. Such virtual background processing may identify boundaries (e.g., edges, shapes, outline, border) at which depiction 114 of user 102 ends and/or analyzing pixel values of the video feed (e.g., to label pixels as belonging to depiction 114 or the background), to determine the location and coordinates at which virtual background 122 may be inserted, using any suitable technique (e.g., machine learning techniques, image processing techniques, image segmentation, edge detection, color pattern recognition, partial linear filtering, regression algorithms, and neural network pattern recognition). The conferencing application running at user equipment device 104 may be configured to transmit the video feed resulting from the virtual background processing to conferencing server 210, and conferencing server 210 may process and/or route the video feed received from user equipment device 104 to a user equipment device associated with user 103 participating in the video conference session. In some embodiments, the conferencing application may take into account motion of user 102 in the video feed during the virtual background processing, e.g., by comparing image frames of video to reveal motion over a period of time. For example, if the video is captured in 30 frames per second, each of the 30 frames may be analyzed to determine if there is motion in each of the frames.

In some embodiments, an operating system of mobile device 104 may provide an indication 106 of a battery level of user equipment device 104, an indication 108 of a strength of cellular network signals being received by user equipment device 104, and an indication 110 of a Wi-Fi network that user equipment device 104 is connected to. Such data may be requested by or otherwise transmitted to conferencing server 210. In some embodiments, any suitable number of parameters or characteristics of user equipment device 104 and/or the ongoing video conferencing session may be monitored by the conferencing application, and transmitted to conferencing server 210. For example, the conferencing application may monitor an overall rate of battery consumption during the video conference, a rate of battery consumption attributable to particular processing tasks, e.g., virtual background processing, encoding an outgoing video feed and audio signals, decoding an incoming audio signals and video feed for rendering, displaying the video, transmit and receive RF power values (e.g., based on velocity of user equipment device 104), a network by which user equipment device 104 is connected to (e.g., cellular network or Wi-Fi), signal strength of received signals, resolution of video, acceleration or movement data of user equipment device 104, one or more quality-of-service characteristics (e.g., available bandwidth, error rate, bit rate, throughput lag, transmission delay, availability, or jitter) experienced by user device 104, and any other suitable parameters. In some embodiments, in determining a rate of battery consumption, the conferencing application may take into account any suitable number of parameters, e.g., screen brightness, graphics display, central processing unit (CPU) power usage or graphic processing unit (GPU) power usage for one or more processing tasks, number of applications currently running on user equipment device 104, power mode, etc.

At 124, during the ongoing video conference session, the conferencing application may determine a type of user equipment device 104. A type of device may be understood as a grouping of devices distinguished by a common characteristic from other devices. For example, a type of device may refer to a type of consumer electronic (e.g., whether the device is a television, a tablet, a personal computer, a mobile device such as, for example, a tablet or a smartphone, a virtual reality of augmented reality device, etc.). In another example, the type of device may refer to the capabilities of the device, e.g., whether or not a particular device can output audio and/or video; how quickly, if at all, content may be downloaded to the device; the power connection and/or battery life; whether or not the device is a mobile device; the resolution, codecs, formats, etc., supported by the device; and/or any other characteristic of a user device that may be relevant. In some embodiments, the conferencing application may cause user equipment device 104 to transmit to conferencing server 210 an indication of a type of user equipment device 104. For example, such indication may be a device identifier, which may be a descriptive attribute such as, for example, at least one of the device name, device type, model number, serial number, manufacturer name, battery life, etc. For example, if a manufacturer of user equipment device 104 is Google, the name of the device is Pixel XL, the model number is 2, and the serial number is 12345, the device identifier may be "Google Pixel XL 2, 12345." Based on such information, the conferencing application, e.g., running at conferencing server 210, may determine that user equipment device 104 corresponds to a mobile device (e.g., a smartphone).

At 126, the conferencing application may begin to monitor one or more parameters of mobile device 104 during the video conference, e.g., battery consumed by certain processing tasks, movement or location data of the mobile device, etc. The parameter data may be collected at any suitable interval (e.g., every 10 seconds or every 20 seconds during the ongoing video conference). In some embodiments, the conferencing application may determine a rate of battery consumption during the video conferencing session, e.g., a percentage of the mobile device battery that is consumed per minute.

Figure 2:
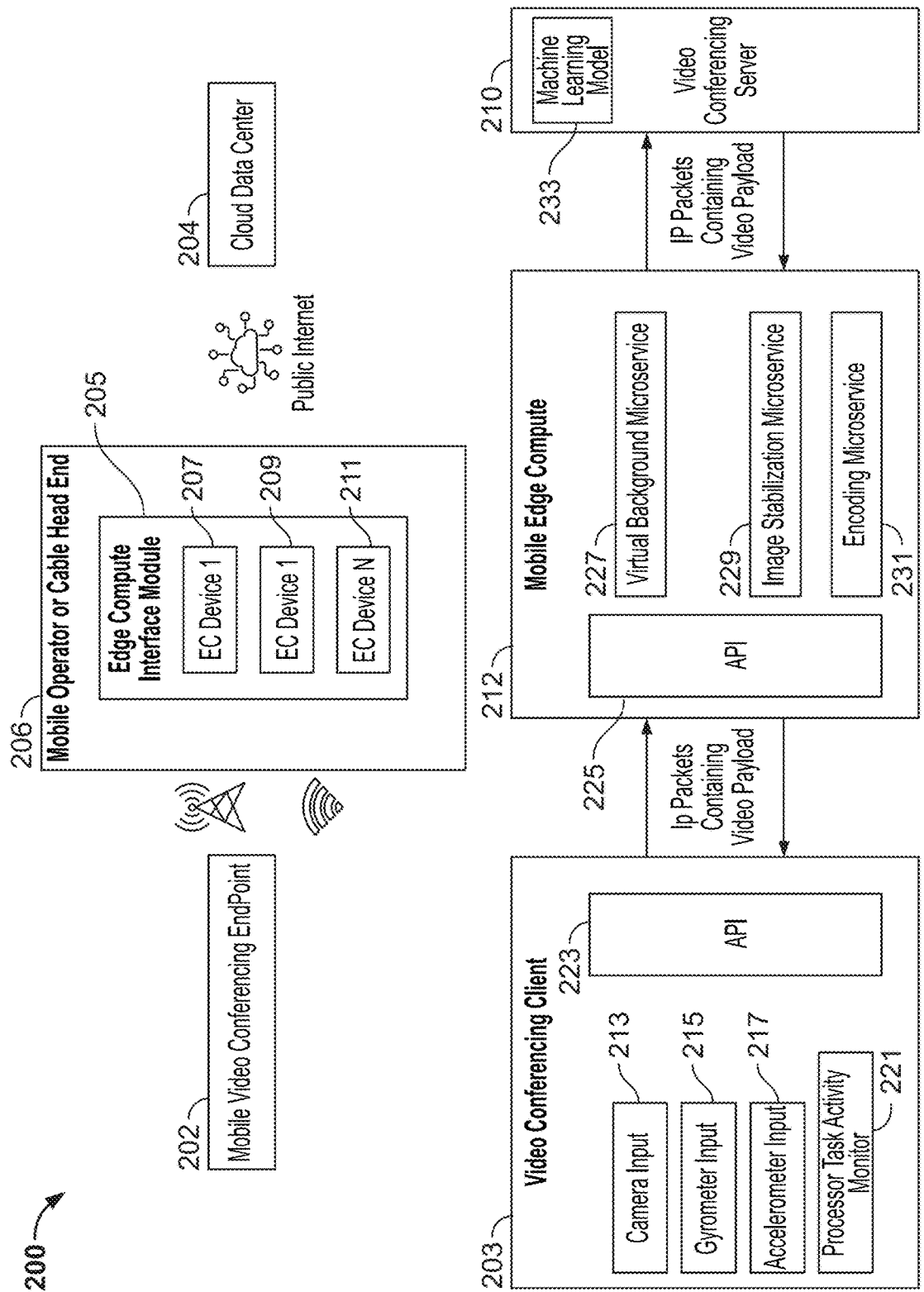
FIG. 2 shows a block diagram of an illustrative system for determining whether a video conference processing task being performed by a mobile device during a video conference should be offloaded to an edge computing device, in accordance with some embodiments of this disclosure.

At 128, the conferencing application may determine, based on the one or more monitored parameters, whether at least a portion of virtual background processing (or at least a portion of one or more other processing tasks) being performed by mobile device 104 should be offloaded to an edge computing device, e.g., mobile edge computing device 210 of FIG. 2. In some embodiments, such determination may be based on whether, under the current conditions of the video conference, the battery life of mobile device 104 is likely to run out prior to the end of the video conference. In some embodiments, the determination of whether at least a portion of the virtual background processing (or at least a portion of one or more other processing tasks) being performed by mobile device 104 should be offloaded to an edge computing device may be based on whether the current battery level, or predicted battery level by the end of the conference, is predicted to fall below a predefined (e.g., user-specified or specified by the system) threshold, e.g., 30% battery, or the current battery level is predicted to run out before the end of the conference. If the conferencing application determines that at least a portion of virtual background processing (or at least a portion of one or more other processing tasks) being performed by mobile device 104 should not be offloaded to an edge computing device at this time (e.g., if the battery level is sufficiently high, such as above a predefined threshold and/or likely to remain charged or remain above a certain threshold by the end of the video conference) processing may return to 126 to continue monitoring parameters of mobile device 104.

At 130, the conferencing application may offload at least a portion of the virtual background processing (or at least a portion of one or more other processing tasks) being performed by mobile device 104 to the edge computing device 210. Edge computing device 210 may be configured to receive a video feed or other imagery (e.g., JPG/PNG format) from mobile device 104, modify the video feed by performing the virtual background processing, and transmit the modified video feed to conferencing server 210. Conferencing server 210 may forward the modified video feed to the user equipment device associated with user 103, thereby maintaining a seamless video conferencing experience for each conference participant and conserving the battery life of one or more mobile devices and/or other devices dependent on battery power to function, by shifting computationally intensive processing to edge computing device 210.

FIG. 2 shows a block diagram of an illustrative system 200 for determining whether a video conference processing task being performed by a mobile device during a video conference should be offloaded to an edge computing device, in accordance with some embodiments of this disclosure. System 200 may comprise mobile video conferencing endpoint 202 (e.g., mobile device 104) in communication with cloud data center 204 and mobile operator or cable head end 206. Mobile video conferencing endpoint 202 may be equipped with an antenna for transmitting and receiving electromagnetic signals at frequencies within the electromagnetic spectrum, e.g., radio frequencies, to communicate with a cellular tower provided by mobile operator 206 (e.g., a telecommunications company) and/or a Wi-Fi access point, modem, switch, or router and/or a satellite. Such cellular tower and/or Wi-Fi access point may provide access to the Internet (e.g., received by way of cable or fiber connections included in backhaul portions of a telecommunications network), and the devices of system 200 may communicate wirelessly over a wireless Local Area Network (WLAN) and with the Internet, and may be present within an effective coverage area of the localized network. The Internet may include a global system of interconnected computer networks and devices employing common communication protocols, e.g., the transmission control protocol (TCP), user datagram protocol (UDP) and the internet protocol (IP) in the TCP/IP internet protocol suite.

Cloud data center 204 may comprise one or more video conferencing servers 210 and/or databases. In some embodiments, system 200 may comprise a plurality of geographically distributed cloud data centers 204, e.g., maintained by an entity associated with the conferencing application or maintained by a cloud computing resources entity. Mobile operator or cable head end 206 may implement edge compute interface module 205 configured to comprise or otherwise be in communication with a plurality of edge computing devices (e.g., servers) 207, 209, 211. In some embodiments, a cloud provider associated with cloud data center 204 may partner with mobile operator 206, which may maintain any suitable number of edge computing devices, which may be geographically distributed in strategic locations. Mobile operator 206 may be configured to receive, over a communication network from video conferencing server 210 of cloud data center 204, an indication that a processing task being performed at a particular client device (e.g., mobile video conferencing endpoint 202) should be offloaded to an edge computing device, e.g., one of edge computing devices 207, 209, 211.

In some embodiments, video conferencing server 210 may be configured to make the determination of whether a processing task being performed at a particular client device should be offloaded to an edge computing device based on the following equation:

Battery consumption per minute at mobile device=Σ (outgoing video encoding battery consumption+ incoming video encoding battery consumption+ video display battery consumption+virtual background processing battery consumption+RF transmit and receive power battery consumption+other non-video conferencing session processes running on the device battery consumption)/(minute)

Such parameters may fluctuate during the video conferencing session. In some embodiments, such data may be collected by the conferencing application at certain time intervals (e.g., every 10-20 seconds) and the rate of battery consumption may be assessed accordingly. In some embodiments, as the velocity of the mobile device increases (e.g., if a mobile device user is riding in a vehicle rather than walking or being stationary), RF power required for transmitting and receiving data may increase, and, as the signal strength and/or signal reception decreases (e.g., regardless of whether the connection is via Wi-Fi or cellular connection), RF power usage may increase to search or find a stronger signal source (e.g., AP/Base Station). For example, the conferencing application may determine that the current battery level is 38% of the total charge capacity of the battery, that the rate of battery consumption corresponds to about 1% per minute while the video conferencing is ongoing, that the duration of the video conference is one hour, and that user 102 has been participating in the video conference for about ten minutes. In such instance, the conferencing application may determine that the battery of the mobile device is unlikely to last for the remaining 50 minutes of the video conference (e.g., since the rate of battery consumption indicates that the battery is likely to run out in about 38 minutes), and thus processing should shift to a mobile edge computing device.

Mobile operator 206 may be configured to manage and allocate processing power for the video conferencing session by matching mobile video conferencing endpoint 202 with a particular edge computing device, to which processing tasks may be offloaded. In some embodiments, the edge computing device matched to mobile video conferencing endpoint 202 may be selected based on having a closest location to mobile video conferencing endpoint 202. In some embodiments, the locations of edge computing devices are not exposed to video conferencing server 210. For example, mobile operator 206 may be configured to transmit an indication to cloud data center 204 (or mobile video conferencing endpoint 202) of which edge computing devices 207, 209, 211 should be matched to the mobile video conferencing endpoint 202, and video conferencing servers 210 of cloud data center 204 may forward such indication to mobile video conferencing endpoint 202. Each edge computing device may comprise one or more servers, and may service any suitable number of conferencing devices within a predefined area of the edge computing device, such as, for example, within a particular regional service area. In some embodiments, the edge computing device may be located closer to device 202 than cloud data center 204. In some embodiments, edge computing devices may store or cache content, e.g., commonly used virtual background imagery, or receive virtual background data along with the video feed received from the mobile device.

For example, if mobile operator 206 indicates that video conferencing client 203 (which may correspond to mobile video conferencing endpoint 202) should offload a virtual background processing task (or one or more portions thereof) being performed during a video conference to mobile edge computing device 212 (which may be implemented in a similar manner as edge computing devices 207, 209, 211), video conferencing client 203 may transmit a video feed (e.g., via API 223, IP packets containing video payload) captured by a camera 213 of device 202 (and/or audio captured by a microphone of device 202) to mobile edge computing device 212. In some embodiments, the conferencing application may be configured to implement processor task activity monitor 221, which may be used to track various processing tasks being performed at video conferencing client 203 during video conferencing sessions. In some embodiments, movement of video conferencing client 203 (e.g., if a user holding video conferencing client 203 is walking or is in a moving vehicle) may be sensed by gyroscope or gyrometer 215, accelerometer 217, a compass, or any other sensor or circuitry capable of detecting and interpreting motion or speed data, and/or orientation data, of video conferencing client 203. Such data may be utilized by video conferencing client 203 to perform image stabilization, and/or utilized by mobile edge computing device 212 if such image stabilization processing if offloaded to mobile edge computing device 212.

In some embodiments, mobile edge computing device 212 may instruct video conferencing client 203 to cease performing certain processing tasks (e.g., at least a portion of virtual background processing, or at least a portion of other processing determined to be consuming substantial local processing resources), and to begin transmitting video and/or audio data to mobile edge computing device 212. Alternatively, video conferencing server 210 may instruct video conferencing client 203 (e.g., based on an indication received from mobile edge computing device 212) to cease performing such processing tasks, and to begin transmitting video and/or audio data to mobile edge computing device 212. Mobile edge computing device 212 may receive video data via API 225, and the conferencing application may implement virtual background microservice 227 at mobile edge computing device 212, to perform the virtual background processing on such video feed. In some embodiments, video conferencing client 203 may transmit imagery (e.g. in a JPG/PNG format) to virtual background microservice 227, where such imagery may correspond to the virtual background having been selected by the user for the current video conference. In some embodiments, the conferencing application may implement image stabilization 229 at mobile edge computing device 212, to perform image stabilization on video frames received from video conferencing client 203, having been determined to be unstable due to movement of the video conferencing client 203 (e.g., being held by a user walking or in a vehicle). In some embodiments, the conferencing application may implement encoding microservice 231 at mobile edge computing device 212, to perform encoding on a video feed captured at video conferencing client 203 (e.g., received as a raw video feed and/or partial video feed from video conferencing client 203). The conferencing application may implement any suitable microservice at mobile edge computing device 212 to perform any suitable offloaded processing task associated with a video conference.

In some embodiments, mobile edge computing device 212 may intercept and pre-process video conferencing streams destined for video conferencing client 203, e.g., in response to determining the battery of video conferencing client 203 is likely to run out or fall below a threshold level during the ongoing video conference (e.g., if current processing conditions continue). For example, video conferencing server 210 or mobile edge computing device 212 may instruct other conferencing devices participating in the video conference with video conferencing client 203 to transmit video and/or audio feeds intended for video conferencing client 203 to mobile edge computing device 212, where mobile edge computing device 212 may process the video feed prior to transmitting such video feed to video conferencing client 203, to reduce the processing (and battery consumed as a result of the processing) video conferencing client 203 would otherwise perform.

In some embodiments, the conferencing application may be configured to transmit video streams using any suitable codec, e.g., scalable video coding (SVC) or advanced video coding (AVC). In SVC, multiple versions of video may be embedded in one bitstream or layer which may conform to a profile. In some embodiments, mobile edge computing device 212 may modify the SVC stream by stripping out of the stream the scalable baseline profile which is compatible with H.264/AVC, and mobile edge computing device 212 may transmit such scalable baseline profile to video conferencing client 203. This may be advantageous as video conferencing client 203 may conserve battery power by avoiding the performance of certain processing, e.g., video conferencing client 203 may not have to decode a full SVC stream (including SVC High Profile or SVC High Intra Profile), and since the scalable baseline profile utilizes less bandwidth, video conferencing client 203 may use less incoming bandwidth, and thus less RF power, thereby reducing battery consumption.

Image stabilization microservice 229 of mobile edge computing device 212 may be configured to apply image stabilization for the video feed received at video conferencing client 203. For example, a user of video conferencing client 203 may be on the go (e.g., walking or in a moving vehicle) during the video conference, causing client 203 to experience bumps and shakes, and thus the video captured at client 203 and transmitted to the other conferencing devices may be unstable and disturbing or distracting to the participants in the video conference. Since running an image stabilization technique locally on client 203 may be a computationally intensive process that reduces the battery life of client 203, such image stabilization technique may be outsourced to mobile edge computing device 212, based on determining that such offloading is appropriate. In some embodiments, video conferencing server 210 or client 203 may transmit data from gyroscope or gyrometer 215 and/or accelerometer 217 to mobile edge computing device 229, and mobile edge computing device 229 may perform the image stabilization of the video feed received from client 211 based on such data, and transmit the modified video feed to the other conference participants. In some embodiments, virtual background service 227 may determine salient points present in the virtual background (e.g., balloons in virtual background 122), and image stabilization microservice 229 may utilize at least a portion of the movement sensor data and map such data to the salient ground truth points that are in the static virtual background to calculate the corrections and smoothening of the video frame(s) of client 203 to reduce impact of the unstable state of client 203 due to the movement. In some embodiments, edge compute interface module 205 may continuously track of the location of client 203 (e.g., based on GPS data transmitted by client 203), and/or track throughput and latency associated with client 203, to ensure that client 203 is matched with the optimal edge computing device.

FIG. 3 shows an illustrative data structure 300 for use in determining whether a video conference processing task being performed by a mobile device during a video conference should be offloaded to an edge computing device, in accordance with some embodiments of this disclosure. In some embodiments, data structure 400 may be stored by one or more of mobile device 203, edge computing device 212, or video conferencing server 210 of FIG. 2. Data structure 400 may comprise any suitable data related to an ongoing video conference for a particular user and a mobile device being utilized by the user for the video conference.

For example, column 302 may indicate which user profiles are participating in the current video conference session. Column 304 may indicate a type of conferencing device (e.g., a Google Pixel smartphone), and column 306 may indicate an amount of time remaining in a conference. In some embodiments, the amount of time remaining in the video conference may be based on comparing a current time to a time that the video conference has been scheduled to end (e.g., as specified by a host or organizer of the video conference). Column 308 may indicate a current battery level of mobile device 104, which may be retrieved by the conferencing application by communicating with an operating system of mobile device 104. For example, based on a device identifier and type of mobile device 104, the conferencing application may determine or retrieve power consumption information related to a battery capacity of mobile device 104 (e.g., 3,500 mAh) and determine that mobile device 104 has a remaining battery level of 38% (e.g., 1330 mAh). In some embodiments, the power consumption information may indicate the amount of time the remaining battery can be used when mobile device 104 is functioning at a specific processing scheme. For example, the power consumption information may indicate the battery of mobile device 104 is likely to remain charged (e.g., above 0%) for 0.5 hours when utilizing 3 GB RAM and 1.5 GHz of processing.

Column 310 may indicate the rate of battery consumption attributable to virtual background processing tasks associated with the ongoing video conference, column 312 may indicate the rate of battery consumption attributable to receive/transmit power, column 314 may indicate the rate of battery consumption attributable to encoding of data for the video conference, column 316 may indicate the rate of battery consumption attributable to decoding of data for the video conference, and column 318 may indicate the rate of battery consumption attributable to graphics display for the video conference. In some embodiments, the conferencing application (e.g., implementing processor task activity monitor 221) may determine, and/or retrieve information from the operating system of mobile device 104 regarding, resources being consumed by the conferencing application overall (e.g., CPU usage, GPU usage, RAM usage) during the video conference, and determine the overall rate of battery consumption attributable to the video conference based on such information. The conferencing application may, e.g., based on the information regarding the overall system resources being used for the video conference, determine a rate of battery consumption of mobile device 104 attributable to the video conference, and/or the rate of battery consumption attributable to each processing task of the video conference. In some embodiments, the conferencing application determines information related to an average processing requirement for certain tasks (e.g., virtual background processing, generally or for certain virtual backgrounds), and may use such information in determining whether processing should be offloaded to an edge computing device. In some embodiments, the device identifier may impact the determined rate of power consumption information (e.g., a newer model smartphone may use less battery power to perform the same task as an older model smartphone). In some embodiments, power consumption related to decoding and/or encoding may be dependent on a video resolution of the video feed of the ongoing video conference.

Column 320 may indicate the rate of battery consumption attributable to other processes or applicants running on mobile device 104, e.g., unrelated to the ongoing video conference. Column 322 may indicate the nature of the connection of mobile device 104 to the video conference. For example, the conferencing application may take into account, in determining the rate of battery consumption of the conferencing application, that a cellular network connection generally uses more power than a Wi-Fi connection, as well as available bandwidth with respect to a given connection. Column 324 may indicate the current overall rate of battery consumption (e.g., attributable to the conferencing application and other processes running on mobile device 104), as determined based on the aforementioned factors. Column 326 may indicate movement sensor data, measured by gyroscope or gyrometer 215 and accelerometer 217, and used for image stabilization processing.

In some embodiments, the conferencing application may base the determination of whether to offload a processing task to an edge computing device at least in part on historical data associated with mobile device 104 (or other similar types of mobile devices). For example, the conferencing application may utilize a heuristic-based analysis and/or machine learning techniques to determine whether the current mobile device and video conferencing conditions (e.g., stored in data structure 300) are similar to an historical instance in which processing was previously offloaded from a mobile device to successfully conserve the battery of such mobile device for the duration of the associated video conference. The conferencing application may determine that offloading of processing is not needed if in the past a similarly situated mobile device was able to last for the duration of the video conference. For example, a machine learning model 233 (e.g., a neural network) may be trained to learn patterns and characteristics associated with a circumstance where processing should be offloaded. In some embodiments, machine learning model 233 may be implemented at video conferencing server 210, and/or at any other suitable portion of system 200.

Figure 4:
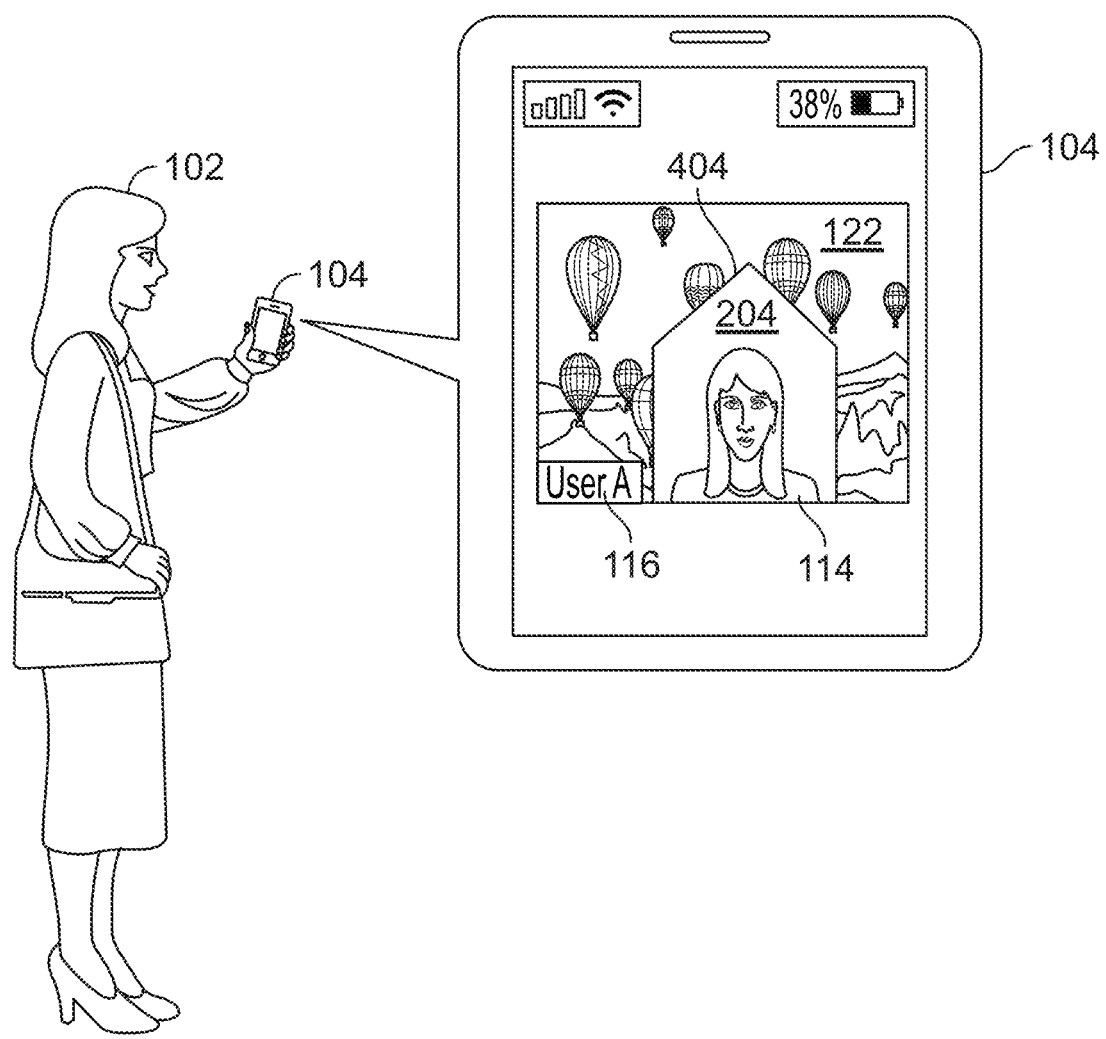
FIG. 4 shows an illustrative technique for transmitting a partial video feed from a conferencing device to an edge computing device, in accordance with some embodiments of this disclosure.

FIG. 4 shows an illustrative technique for transmitting a partial video feed from a conferencing device to an edge computing device, in accordance with some embodiments of this disclosure. In the example of FIG. 4, the conferencing application may have already determined that virtual background processing should be offloaded to an edge computing device. In some embodiments, given the status of the battery of mobile device 104 in the example of FIG. 4, it may be desirable to transmit a partial feed comprising polygon 404 to the edge computing device. For example, when battery level is not an issue, the conferencing application may transmit a full video feed (e.g., including virtual background), and/or mobile device 104 may perform processing to attempt the detection of the exact or most accurate boundaries of the human figure depicted in the video feed. However, such processing may be computationally intensive and thus undesirable to be performed at mobile device 104 when the battery life of mobile device 104 is determined to be low or likely to run out during the video conference. Thus, the partial video feed may be transmitted, where such partial video feed may not include the virtual background and/or may comprise a rough approximation of the outlines of the human figure captured by the camera of mobile device 104. Polygon 404 may be generated by the conferencing application such that polygon 404 generally surrounds depiction 114 of user 102, e.g., a rough approximation of the boundaries of depiction 114. It may be desirable to generate polygon 404, as opposed to locally performing computationally intensive processes (e.g., machine learning techniques, image processing techniques, image segmentation, edge detection, color pattern recognition, partial linear filtering, regression algorithms, and neural network pattern recognition) to identify a more accurate or exact outline of the boundary of depiction 114. In some embodiments, the partial video feed comprising polygon 404 and depiction 114 may be transmitted in the form of raw data or encoded prior to being transmitted to the edge computing device for further processing. In some embodiments, polygon 404 may surround only the face of user 102.

Upon receiving the partial video feed comprising polygon 404 and depiction 114, the edge computing device may perform virtual background processing, e.g., to insert the same virtual background as in prior frames of the video feed received from user equipment device 104, thereby enabling user equipment device 104 to conserve battery power during the remainder of the video conference. Additionally or alternatively, the conferencing application may cause the edge computing device to perform the computationally intensive processing corresponding to detecting the exact boundaries of the human figure depicted in the received partial video feed comprising the polygon. Thus, a high-quality video conferencing experience for each conference participant may be maintained, and battery life of mobile device 104 may be preserved, by offloading computationally intensive identification of the boundary of the depiction of the user to the edge computing device In some embodiments, polygon 404 may be displayed to user 102, along with a recommendation or prompt for user 102 to attempt to keep his or her depiction 114 within the bounds of polygon 404. In some embodiments, the conferencing application may generate for output a notification indicating that user 102 should draw (e.g., via a touchscreen) an outline around his or her depiction 114, to assist the conferencing application to identify the boundaries of depiction 114 in a less computationally intensive manner. In some embodiments, the conferencing application may select a blur or simple virtual background on user device 104, and the partial video feed may comprise a reduced resolution background and a higher resolution depiction 114.

Figure 5:
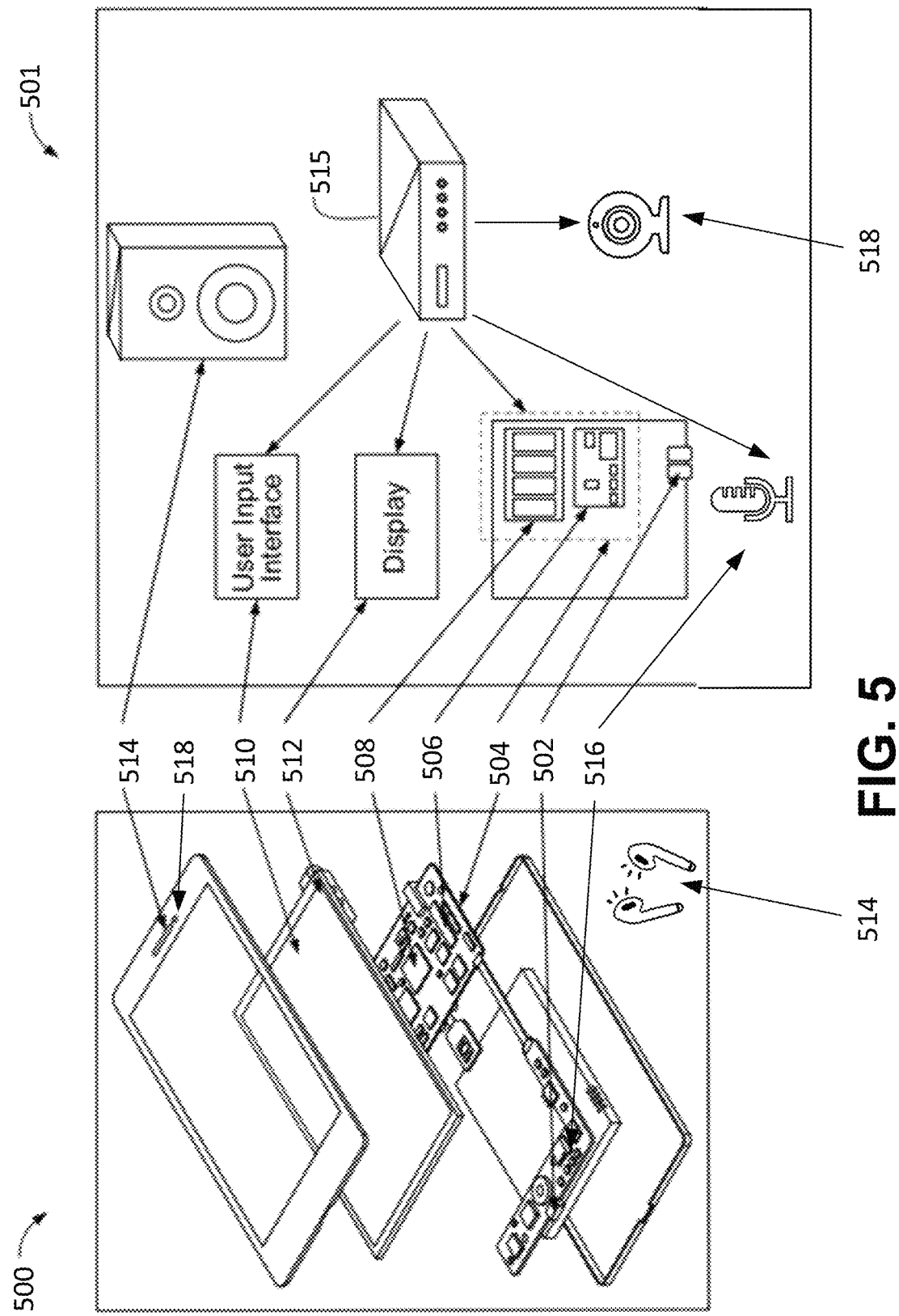
FIG. 5 shows an illustrative user equipment device, in accordance with some embodiments of this disclosure.
Figure 6:
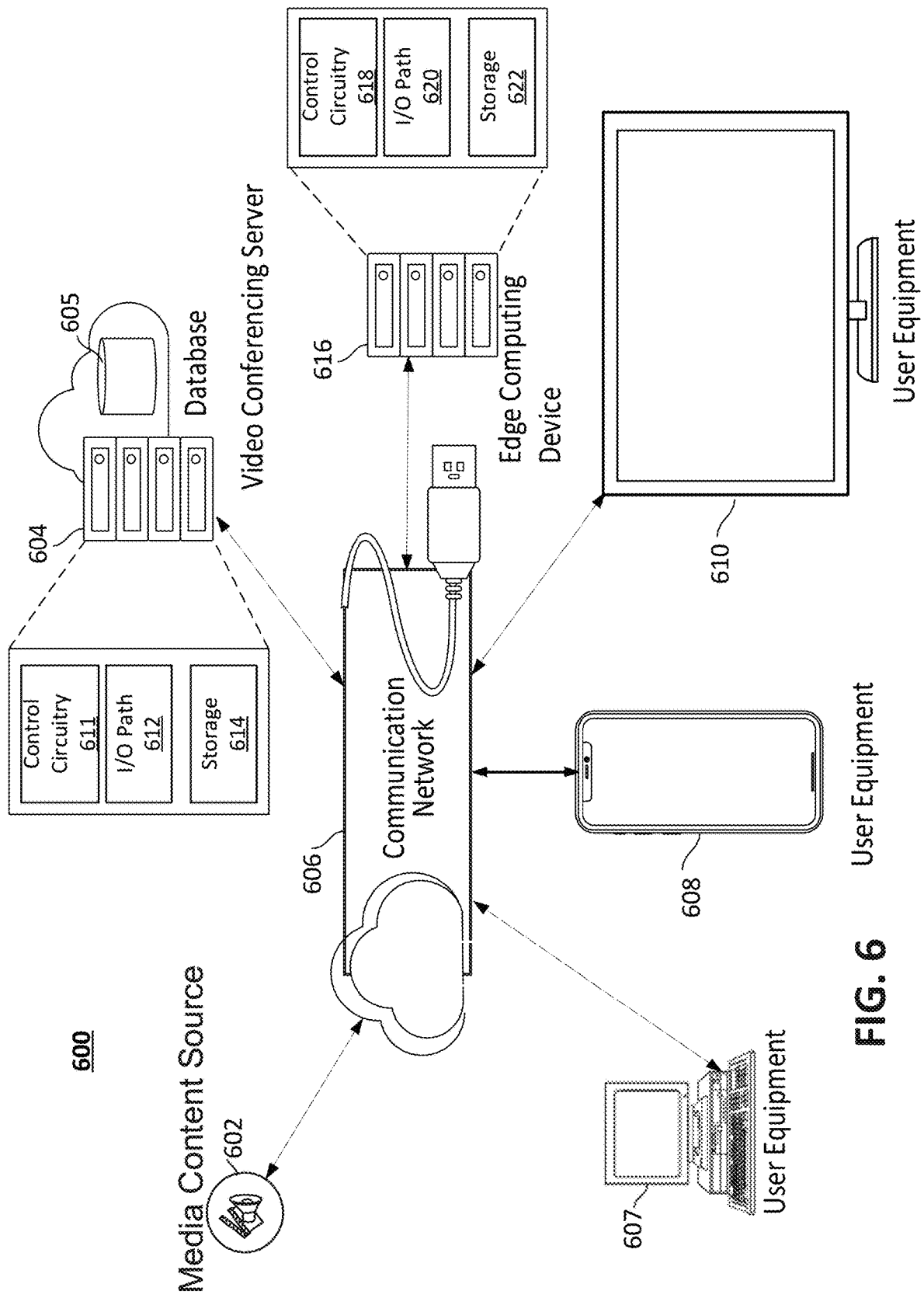
FIG. 6 shows a system, in accordance with some embodiments of this disclosure.

FIGS. 5-6 describe illustrative devices, systems, servers, and related hardware for determining whether a video conference processing task being performed by a mobile device during a video conference should be offloaded to an edge computing device, in accordance with some embodiments of the present disclosure. FIG. 5 shows generalized embodiments of illustrative user equipment devices 500 and 501, which may correspond to, e.g., conferencing device 104, mobile video conferencing endpoint 202 and/or video conferencing client 203. For example, user equipment device 500 may be a smartphone device, a tablet, a virtual reality or augmented reality device, or any other suitable device capable of participating in a video conference over a communication network. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a video conference participant and/or ambient audio data during a video conference. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 500 may comprise any suitable number of sensors (e.g., gyroscope or gyrometer 215, accelerometer 217 of FIG. 2), as well as a GPS module (e.g., in communication with one or more servers and/or cell towers and/or satellites) to ascertain a location of device 500. In some embodiments, device 500 comprises a rechargeable battery that is configured to provide Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the conferencing application stored in memory (e.g., storage 508). Specifically, control circuitry 504 may be instructed by the conferencing application to perform the functions discussed above and below. In some implementations, processing or actions performed by control circuitry 504 may be based on instructions received from the conferencing application.

In client/server-based embodiments, control circuitry 504 may include communications circuitry suitable for communicating with a conferencing server or other networks or servers. The conferencing application may be a stand-alone application implemented on a device or a server. The conferencing application may be implemented as software or a set of executable instructions. The instructions for performing any of the embodiments discussed herein of the conferencing application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the conferencing application may be a client/server application where only the client application resides on device 500 (e.g., device 104), and a server application resides on an external server (e.g., server 604 and/or server 616). For example, the conferencing application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing video conferencing capabilities, providing storage (e.g., for a database) or parsing data are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the conferencing application may instruct control 611 or 618 circuitry to perform processing tasks for the client device and facilitate the video conference. The client application may instruct control circuitry 504 to determine whether processing should be offloaded. In some embodiments, the video conference may correspond to one or more of online meetings, virtual meeting rooms, video calls, Internet Protocol (IP) video calls, etc.

Control circuitry 504 may include communications circuitry suitable for communicating with a conferencing server, edge computing systems and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as conferencing application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video conferencing data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The conferencing application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide video conferencing functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from a conference participant profile. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the conferencing application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the conferencing application may be downloaded and interpreted or otherwise run by an interpreter or virtual machine (run by control circuitry 504). In some embodiments, the conferencing application may be encoded in the ETV Binary Interchange Format (EBIF), received by control circuitry 504 as part of a suitable feed, and interpreted by a user agent running on control circuitry 504. For example, the conferencing application may be an EBIF application. In some embodiments, the conferencing application may be defined by a series of JAVA-based files that are received and run by a local virtual machine or other suitable middleware executed by control circuitry 504. In some of such embodiments (e.g., those employing MPEG-2 or other digital media encoding schemes), conferencing application may be, for example, encoded and transmitted in an MPEG-2 object carousel with the MPEG audio and video packets of a program.

FIG. 6 is a diagram of an illustrative system 600 for determining whether a video conference processing task being performed by a mobile device during a video conference should be offloaded to an edge computing device, in accordance with some embodiments of this disclosure. User equipment devices 607, 608, 610 (e.g., which may correspond to one or more of conferencing device 104, mobile video conferencing endpoint 202 and/or video conferencing client 203) may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more conferencing servers 604, and one or more edge computing devices 616 (e.g., included as part of an edge computing system, such as, for example, managed by mobile operator 206). In some embodiments, the conferencing application may be executed at one or more of control circuitry 611 of conferencing server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide video conferencing data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of conferencing server 604. Edge computing device 616 may be configured to be in communication with one or more of user equipment devices 607, 608, 610 and video conferencing server 604 over communication network 606, and may be configured to perform processing tasks (e.g., virtual background processing, encoding, decoding) in connection with ongoing video conferences on behalf of a battery-challenged user equipment device participating in the video conference, e.g., at the request of video conferencing server 604 managing the video conference participants. In some embodiments, a plurality of edge computing devices 616 may be strategically located at various geographic locations, and may be mobile edge computing devices configured to provide processing support for mobile devices at various geographical regions.

Figure 7:
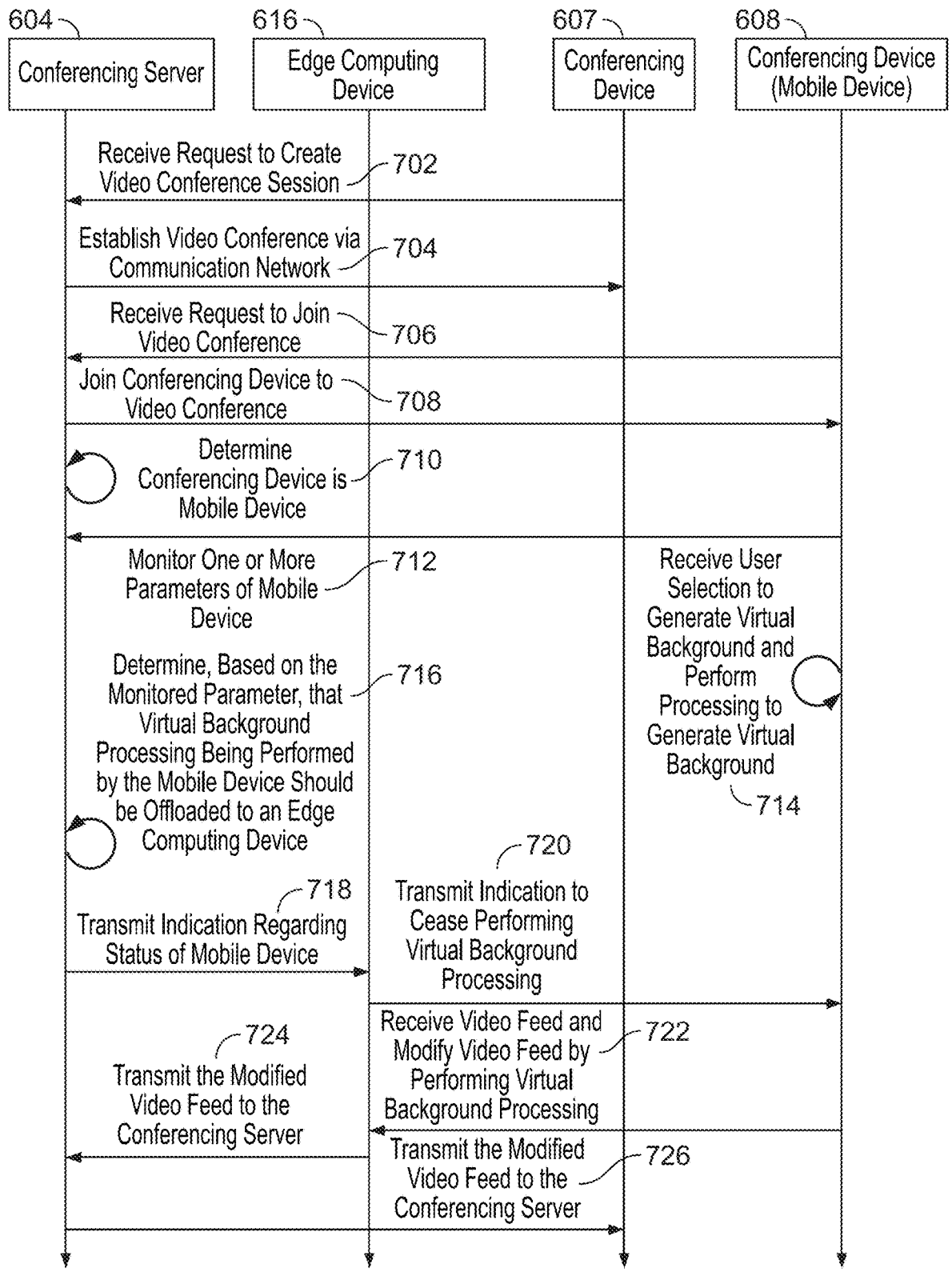
FIG. 7 is a flowchart of a detailed illustrative process for determining whether a video conference processing task being performed by a mobile device during a video conference should be offloaded to an edge computing device, in accordance with some embodiments of this disclosure.

FIG. 7 is a flowchart of a detailed illustrative process 700 for determining whether a video conference processing task being performed by a mobile device during a video conference should be offloaded to an edge computing device, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At 702, control circuitry (e.g., control circuitry 611 of conferencing server 604) may receive a request to create a video conference session. Such request may be received from conferencing device 607 (e.g., associated with user 102 of FIG. 1) or any other suitable device (e.g., conferencing device 608, which may be correspond to conferencing device 104 and may be associated with user 103 of FIG. 1).

At 704, control circuitry 611 may establish a video conference via communication network 606 with one or more conferencing devices. For example, conferencing device 607 may be being utilized by a moderator or host of the video conference. Such user may have scheduled the video conference for a particular time, and may request to access or begin the video conferencing session at the scheduled time. Alternatively, the video conference may simply be spontaneous, e.g., a request received at the conferencing device to video chat with a friend of the user.

At 706, control circuitry 611 may receive a request from conferencing device 607 to join the ongoing video conference, and in response to receiving such request, control circuitry 611 may (at 708) join control circuitry 611 to the video conference hosted by conferencing server 604. During the video conference, conferencing server 604 manages and facilitates the video conferencing session, e.g., receives audio and video data captured by respective cameras (e.g., camera 518 of FIG. 5) and microphones (e.g., microphone 516 of FIG. 5) of conferencing devices 607 and 608, performs routing and/or processing of the data to the conference participants over communication network 606, to enable output of the audio and video data at each of conferencing devices 607 and 608.

At 710, control circuitry 611 may determine that conferencing device 608 is a mobile device (e.g., a smartphone, a tablet, etc.). In some embodiments, such determination may be based on identifying information (e.g., indicated at column 304 of data structure 300 of FIG. 3) transmitted from conferencing device 608 to conferencing server 604. In response to determining that conferencing device 608 is a mobile device, control circuitry 611 of conferencing server 604 may (at 712) monitor one or more parameters of mobile device (e.g., a current battery level of the mobile device, a rate of battery consumption attributable to one or more processing tasks being performed by the mobile device). For example, control circuitry 611 of conferencing server 604 may request or otherwise receive such information from conferencing device 608.

At 714, control circuitry 504 of device 500 (which may correspond to conferencing device 608) may receive a user selection to generate a virtual background 122 (e.g., balloons of FIG. 1) and perform processing to generate the virtual background. In some embodiments, the virtual background may surround a boundary of a depiction 114 of user 102, and virtual background 122 and depiction 114 may be provided to each conference participant (including user 102) for output at the respective conferencing devices.

At 716, control circuitry 611 may determine, based on the monitored one or more parameters (at 712), that at least a portion of a particular processing task (e.g., virtual background processing) being performed by conferencing device 608 should be offloaded to an edge computing device 616. For example, such determination may be based a current battery level of conferencing device 608, a current rate of battery consumption, and an amount of time remaining in the conference. For example, control circuitry 611 may determine that the current battery level is 38% of the total charge capacity of the battery, that the rate of battery consumption corresponds to about 1% per minute while the video conferencing is ongoing, that the duration of the video conference is one hour, and that user 102 has been participating in the video conference for about ten minutes. In such instance, the conferencing application may determine that the battery of the mobile device is unlikely to last for the remaining 50 minutes of the video conference (e.g., since the rate of battery consumption indicates that the battery is likely to run out in about 38 minutes), and thus processing should shift to a mobile edge computing device.

At 718, control circuitry 611 may transmit an indication regarding the status (e.g., battery status and predicted state of battery by the end of the video conference) to edge computing device 616. In some embodiments, such indication may be transmitted to mobile operator or cable head end 206 of FIG. 2, which in turn may identify an appropriate edge computing device (e.g., 207, 209 or 211) to be matched with conferencing device 608, based on a location of the conferencing device (e.g., selecting a closest edge computing device to a current location of conferencing device 608). In some embodiments, various interventions may be performed (e.g., offloading any suitable processing task to the edge computing device, recommending a suitable option to maximize battery life of the mobile device, selectively turning off audio or video of the video conference at certain times, stabilizing images, etc.).

At 720, control circuitry 618 of edge computing device 616 may transmit an indication to conferencing device 608 to cease performing at least a portion of virtual background processing (or another processing task). In response, control circuitry 618 may receive (at 722) the video feed comprising depiction 114 from conferencing device 608, conferencing device 608 may cease performing at least a portion of the virtual background processing, and control circuitry 618 may modify the received video feed by performing at least a portion of the virtual background processing (e.g., virtual background 122). In some embodiments, edge computing device 616 may receive an indication from conferencing server 604 of which virtual background was being used by conferencing device 608 prior to offloading at least a portion of the processing task, and perform the virtual background processing based on this indication.

At 724, control circuitry 618 of edge computing device 616 may transmit the modified video feed to conferencing server 604, and conferencing server 604 may forward (at 726) such modified video feed (e.g., comprising virtual background 122 and depiction 114) to conferencing device 608 for output at conferencing device 608.

Figure 8:
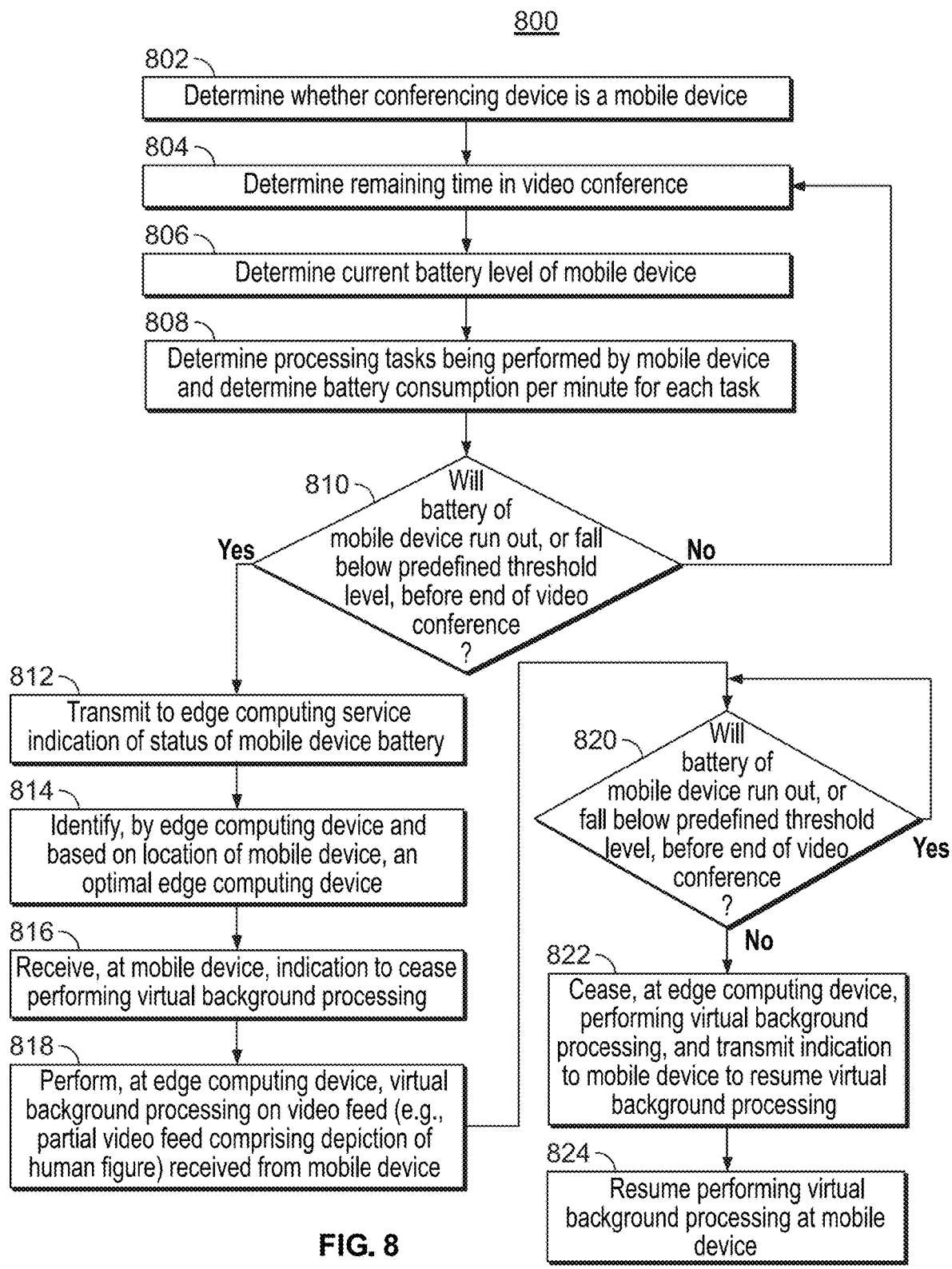
FIG. 8 is a flowchart of a detailed illustrative process for determining whether a video conference processing task being performed by a mobile device during a video conference should be offloaded to an edge computing device, in accordance with some embodiments of this disclosure.

FIG. 8 is a flowchart of a detailed illustrative process 800 for determining whether a video conference processing task being performed by a mobile device during a video conference should be offloaded to an edge computing device, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At 802, control circuitry 611 of conferencing server 604 may determine whether conferencing device 608 is a mobile device. In some embodiments, such determination may be based on receiving identifying information from conferencing device 608, or other information (e.g., sensor data from accelerometer 217) to determine that conferencing device 608 is associated with a particular velocity (e.g., above a certain threshold), indicating that conferencing device 608 is a mobile device.

At 804, control circuitry 611 of conferencing server 604 may determine the remaining time in an ongoing video conference that conferencing device 608 is participating in. For example, control circuitry 611 may determine a time that the video conference is scheduled to end (or determine that historically, calls between the current video conference participants last for a certain amount of time), and determine, by comparing a current time to the end time, the amount of time remaining in the video conference.

At 806, control circuitry 611 of conferencing server 604 may determine a current battery level of conferencing device 608. For example, control circuitry 611 may receive information from conferencing device 608 indicating that the current battery level is 38% of the total charge capacity of the battery.

At 808, control circuitry 611 of conferencing server 604 may determine processing tasks being performed at conferencing device 608 and determine battery consumption per minute for each task. For example, conferencing server 604 may receive information from conferencing device 608 indicating power consumption information of the conferencing application and/or power consumption information of specific processing tasks being performed by conferencing device 608, and store such information as data structure 300 at storage 614 and/or database 605. In some embodiments, control circuitry 611 may determine processing tasks, and related battery consumption rates per minute, for, e.g., video encoding, video decoding, graphics display, virtual background insertion, RF transmit/receive power based at least in part by mobile device velocity, etc.

At 810, control circuitry 611 of conferencing server 604 may determine whether the battery of conferencing device 608 is likely to run out, or fall below a predefined threshold level, before end of the video conference. For example, control circuitry 611 may determine that the current battery level is 38% of the total charge capacity of the battery, that the rate of battery consumption corresponds to about 1% per minute while the video conferencing is ongoing, that the duration of the video conference is one hour, and that user 102 has been participating in the video conference for about ten minutes. In such instance, the conferencing application may determine that the battery of the mobile device is unlikely to last for the remaining 50 minutes of the video conference (e.g., since the rate of battery consumption indicates that the battery is likely to run out in about 38 minutes), and thus processing should shift to a mobile edge computing device (e.g., processing moves to 812). On the other hand, if at 810 control circuitry 611 determines the battery is likely to last or remain above a predefined threshold by the end of the video conference, processing may return to 804.

At 812, control circuitry 611 of conferencing server 604 may transmit to edge computing service 206 an indication of the status of the mobile device battery, e.g., indicating that an edge computing device should take over certain processing tasks currently being performed at conferencing device 608.

At 814, edge computing service 206 may identify, based on a location of conferencing device 608 (e.g., determined based on a GPS model of conferencing device 608), an optimal edge computing device to offload processing to. For example, edge computing service 206 may identify edge computing device 616 as being closest to a current location of conferencing device 608 and having the capacity to take over certain processing tasks of the mobile device at the current time.

At 816, conferencing device 608 may receive an indication to cease performing at least a portion of virtual background processing (e.g., from conferencing server 604 and/or edge computing service 206), in order to conserve battery power of conferencing device 608 during the video conference.

At 818, control circuitry 618 of edge computing device 616 may perform the offloaded processing task (e.g., virtual background processing) on a video feed (e.g., a partial video feed comprising depiction 114 of a human figure and polygon 404, as shown in FIG. 4) received from conferencing device 608. For example, control circuitry 618 may insert virtual background 122 behind depiction 114 (and remove polygon 404 from the imagery). In some embodiments, control circuitry 618 of edge computing device 616 may be configured to intercept video feeds from other conference participants intended for conferencing device 608, to preprocess such video feeds prior to transmission to conferencing device 608, in order to conserve battery power of conferencing device 608 during the video conference.

At 820, control circuitry 611 of conferencing server 604 may perform a similar determination as at 810. For example, if conferencing server 604 is being re-charged, control circuitry 611 may receive an indication of the battery level (e.g., exceeding a predefined threshold or otherwise predicted to last for the remainder of the video conference).

At 822, edge computing device 616 may cease performing at least a portion of the virtual background processing, based on an indication received from conferencing server 604 of conferencing device 608 indicating that conferencing device 608 is able to resume performing the processing task having been offloaded. In some embodiments, edge computing device 616 or conferencing server 604 may transmit an indication to the conferencing device (e.g., mobile device 608 of FIG. 6) to resume at least a portion of the virtual background processing.

At 824, mobile device 608 may resume performing virtual background processing at the conferencing device (e.g., mobile device 608 of FIG. 6), to generate for display a video feed comprising depiction 114 and virtual background 122 locally, and transmitting such video feed to conferencing server 604, which in turn may provide the video feed to the other conference participants.

Figure 9:
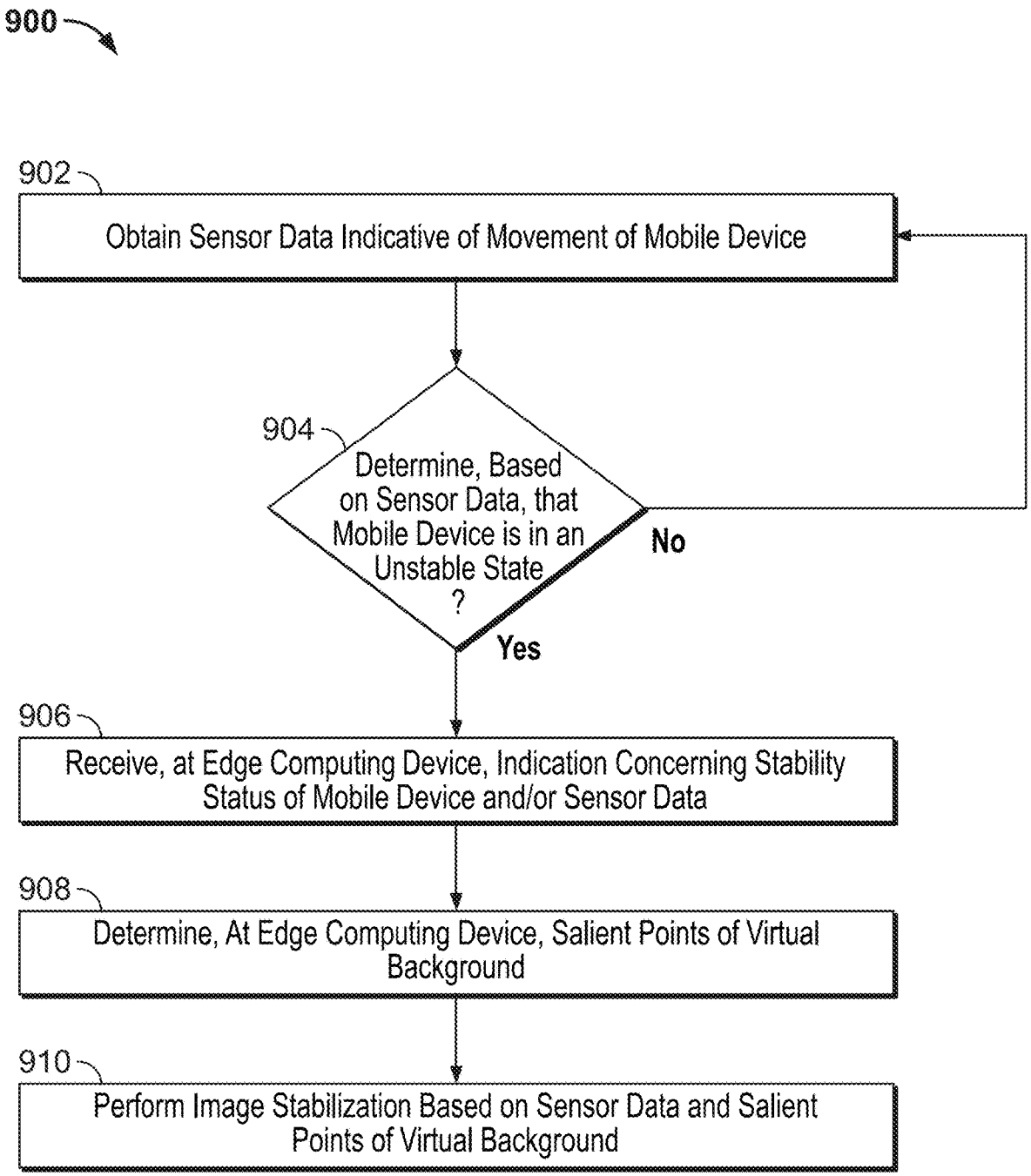
FIG. 9 is a flowchart of a detailed illustrative process for performing image stabilization during a video conference, in accordance with some embodiments of this disclosure.

FIG. 9 is a flowchart of a detailed illustrative process 900 for determining whether a video conference processing task being performed by a mobile device during a video conference should be offloaded to an edge computing device, in accordance with some embodiments of this disclosure. In various embodiments, the individual steps of process 900 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At 902, control circuitry 611 of video conferencing server 604 may obtain sensor data (e.g., from camera 213, gyrometer 215, accelerometer 217) indicative of movement of mobile device 104. In some embodiments, such data may be transmitted from user device 104 to conferencing server 604 in response to a determination (at 904) that such sensor data is indicative that mobile device 104 is experiencing shaking, bumps, and/or an overall instable state (e.g., the user is walking up a flight of stairs or a hill, or is in a vehicle traveling on a bumpy road) as opposed to being held on the hand in a static manner or lying flat on a surface.

At 906, control circuitry 618 of edge computing device 616 may receive an indication concerning stability status of mobile device and/or sensor data. In some embodiments, conferencing server 604 may transmit such information to edge computing device 616.

At 908, control circuitry 618 of edge computing device 616 may determine (e.g., via virtual background microservice 227 and/or image stabilization microservice 229) salient points of virtual background 122 during the ongoing video conference. For example, control circuitry 618 may determine, or receive information regarding, fixed portions of virtual background 122.

At 910, control circuitry 618 of edge computing device 616 may perform image stabilization based at least in part on sensor data and salient points of virtual background. For example, virtual background service 227 may determine salient points present in the virtual background (e.g., balloons in virtual background 122), and image stabilization microservice 229 may utilize the movement sensor data and map such data to the salient ground truth points that are in the static virtual background to compute corrections and smoothening of the video frame(s) of client 203 to reduce impact of the unstable state of client 203 due to the movement. In some embodiments, edge compute interface module 205 may continuously track of the location of client 203 (e.g., based on GPS data transmitted by client 203), and/or track throughput and latency associated with client 203, to ensure that client 203 is matched with the optimal edge computing device.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implanted method comprising:
determining that a mobile computing device is participating in a video conference via a conferencing server, wherein the mobile computing device is located at a first geographic location and is in communication with the conferencing server via a communication network, and wherein during the video conference, a virtual background is being provided for display at the mobile computing device based at least in part on virtual background processing being performed at the mobile computing device;
monitoring a parameter of the mobile computing device during the video conference; and
determining, based on the monitored parameter, whether at least a portion of the virtual background processing being performed by the mobile computing device should be offloaded to an edge computing device located at a second geographic location remote from the first geographic location of the mobile computing device; and
in response to determining that at least a portion of the virtual background processing being performed by the mobile computing device should be offloaded to the edge computing device, offloading the at least a portion of the virtual background processing being performed by the mobile computing device to the edge computing device by:
causing the mobile computing device to transmit, to the edge computing device and via the communication network, a video feed captured by the mobile computing device;
causing the edge computing device to modify the video feed by performing the at least a portion of the virtual background processing; and
receiving, at the conferencing server from the edge computing device via the communication network, the modified video feed.

2. The method of claim 1, further comprising:
prior to the offloading of the at least a portion of the virtual background processing being performed by the mobile computing device to the edge computing device, causing the mobile computing device to transmit a full video feed comprising a depiction of a human figure and the virtual background; and
subsequent to determining that the at least a portion of the virtual background processing being performed by the mobile computing device should be offloaded to the edge computing device, causing the mobile computing device to transmit a partial video feed that comprises the depiction of a human figure and that does not comprise the virtual background.

3. The method of claim 2, wherein the partial video feed transmitted by the mobile computing device comprises a polygonal portion of the full video feed that comprises the depiction of the human figure and approximates boundaries of the human figure.

4. The method of claim 1, further comprising:
prior to the offloading of the at least a portion of the virtual background processing being performed by the mobile computing device to the edge computing device, causing the mobile computing device to transmit a full video feed comprising a depiction of a human figure and a particular portion of the virtual background; and
subsequent to determining that the at least a portion of the virtual background processing being performed by the mobile computing device should be offloaded to the edge computing device, causing the mobile computing device to transmit a partial video feed that comprises the depiction of a human figure and that that comprises a portion of the virtual background that is less than the particular portion.

5. The method of claim 1, wherein:
monitoring the parameter of the mobile computing device during the video conference comprises:
determining a current battery level of a battery of the mobile computing device; and
determining whether the current battery level exceeds a threshold battery level; and
determining, based on the monitored parameter, whether the virtual background processing being performed by the mobile computing device should be offloaded to the edge computing device comprises determining whether the current battery level exceeds the threshold battery level.

6. The method of claim 1, wherein:
monitoring the parameter of the mobile computing device during the video conference comprises:
determining a current battery level of a battery of the mobile computing device;
determining an amount of time before the video conference concludes; and
determining a rate of battery consumption of the battery of the mobile computing device based on one or more video conferencing processing tasks being performing by the mobile computing device; and
determining, based on the monitored parameter, whether the virtual background processing being performed by the mobile computing device should be offloaded to the edge computing device comprises:
determining, based on the current battery level, the rate of battery consumption, and the amount of time before the video conference concludes, whether the battery of the mobile computing device will fall below a threshold level of charge before the conclusion of the video conference if the one or more video conferencing processing tasks continue to be performed by the mobile computing device; and
determining that the at least a portion of the virtual background processing being performed by the mobile computing device should be offloaded to the edge computing device based on determining that the battery of the mobile computing device will fall below the threshold level of charge before the conclusion of the video conference if the one or more video conferencing processing tasks continue to be performed by the mobile computing device.

7. The method of claim 1, wherein:
the mobile computing device is a first conferencing device, and a second conferencing device is participating in the video conference via the conferencing server; and
the conferencing server is further configured to cause the edge computing device to:
receive, from the second conferencing device, a video feed intended for the mobile computing device;
process the video feed intended for the mobile computing device; and
transmit the processed video feed to the mobile computing device.

8. The method of claim 1, wherein:
monitoring the parameter of the mobile computing device during the video conference comprises determining, based on sensor data received from the mobile computing device, that a video frame captured by the mobile computing device during the video conference is unstable, wherein the sensor data is indicative of movement of the mobile computing device; and offloading the at least a portion of the virtual background processing being performed by the mobile computing device to the edge computing device comprises causing the unstable video frame to be transmitted to the edge computing device, wherein the edge computing device stabilizes the video frame based at least in part on the sensor data.

9. The method of claim 8, further comprising:

causing the edge computing device to identify one or more salient portions of the virtual background and stabilize the video frame further based on the identified one or more salient portions of the virtual background.

10. The method of claim 1, wherein the mobile computing device is a smartphone, and the edge computing device is a mobile edge computing device.

11. A system comprising:

computer memory;

control circuitry configured to:

determine that a mobile computing device is participating in a video conference via a conferencing server, wherein the mobile computing device is located at a first geographic location and is in communication with the conferencing server via a communication network, and wherein during the video conference, a virtual background is being provided for display at the mobile computing device based at least in part on virtual background processing being performed at the mobile computing device;

monitor a parameter of the mobile computing device during the video conference; and determine, based on the monitored parameter, whether at least a portion of the virtual background processing being performed by the mobile computing device should be offloaded to an edge computing device located at a second geographic location remote from the first geographic location of the mobile computing device; and in response to determining that at least a portion of the virtual background processing being performed by the mobile computing device should be offloaded to the edge computing device, offload the at least a portion of the virtual background processing being performed by the mobile computing device to the edge computing device by:

causing the mobile computing device to transmit, to the edge computing device and via the communication network, a video feed captured by the mobile computing device;

causing the edge computing device to modify the video feed by performing the at least a portion of the virtual background processing; and receiving, at the conferencing server from the edge computing device via the communication network, the modified video feed.

12. The system of claim 11, wherein the control circuitry is further configured to:

prior to the offloading of the at least a portion of the virtual background processing being performed by the mobile computing device to the edge computing device, cause the mobile computing device to transmit a full video feed comprising a depiction of a human figure and the virtual background; and subsequent to determining that the at least a portion of the virtual background processing being performed by the mobile computing device should be offloaded to the edge computing device, cause the mobile computing device to transmit a partial video feed that comprises the depiction of a human figure and that does not comprise the virtual background.

13. The system of claim 12, wherein the partial video feed transmitted by the mobile computing device comprises a polygonal portion of the full video feed that comprises the depiction of the human figure and approximates boundaries of the human figure.

14. The system of claim 11, wherein the control circuitry is further configured to:

prior to the offloading of the at least a portion of the virtual background processing being performed by the mobile computing device to the edge computing device, cause the mobile computing device to transmit a full video feed comprising a depiction of a human figure and a particular portion of the virtual background; and subsequent to determining that the at least a portion of the virtual background processing being performed by the mobile computing device should be offloaded to the edge computing device, cause the mobile computing device to transmit a partial video feed that comprises the depiction of a human figure and that that comprises a portion of the virtual background that is less than the particular portion.

15. The system of claim 11, wherein the control circuitry is further configured to:

monitor the parameter of the mobile computing device during the video conference by:

determining a current battery level of a battery of the mobile computing device; and determining whether the current battery level exceeds a threshold battery level; and determining, based on the monitored parameter, whether the virtual background processing being performed by the mobile computing device should be offloaded to the edge computing device comprises determining whether the current battery level exceeds the threshold battery level.

16. The system of claim 11, wherein the control circuitry is further configured to:

monitor the parameter of the mobile computing device during the video conference by:

determining a current battery level of a battery of the mobile computing device;

determining an amount of time before the video conference concludes; and determining a rate of battery consumption of the battery of the mobile computing device based on one or more video conferencing processing tasks being performing by the mobile computing device; and determining, based on the monitored parameter, whether the virtual background processing being performed by the mobile computing device should be offloaded to the edge computing device comprises:

determining, based on the current battery level, the rate of battery consumption, and the amount of time before the video conference concludes, whether the battery of the mobile computing device will fall below a threshold level of charge before the conclusion of the video conference if the one or more video conferencing processing tasks continue to be performed by the mobile computing device; and determining that the at least a portion of the virtual background processing being performed by the mobile computing device should be offloaded to the edge computing device based on determining that the battery of the mobile computing device will fall below the threshold level of charge before the conclusion of the video conference if the one or more video conferencing processing tasks continue to be performed by the mobile computing device.

17. The system of claim 11, wherein:
the mobile computing device is a first conferencing device, and a second conferencing device is participating in the video conference via the conferencing server; and
the control circuitry is further configured to cause the edge computing device to:
receive, from the second conferencing device, a video feed intended for the mobile computing device;
process the video feed intended for the mobile computing device; and
transmit the processed video feed to the mobile computing device.

18. The system of claim 11, wherein the control circuitry is further configured to:
monitor the parameter of the mobile computing device during the video conference by determining, based on sensor data received from the mobile computing device, that a video frame captured by the mobile computing device during the video conference is unstable, wherein the sensor data is indicative of movement of the mobile computing device; and
offload the at least a portion of the virtual background processing being performed by the mobile computing device to the edge computing device by causing the unstable video frame to be transmitted to the edge computing device, wherein the edge computing device stabilizes the video frame based at least in part on the sensor data.

19. The system of claim 18, wherein the control circuitry is further configured to:
cause the edge computing device to identify one or more salient portions of the virtual background and stabilize the video frame further based on the identified one or more salient portions of the virtual background.

20. The system of claim 11, wherein the mobile computing device is a smartphone, and the edge computing device is a mobile edge computing device.

* * * * *